(12) United States Patent
Takada

(10) Patent No.: US 11,815,399 B2
(45) Date of Patent: Nov. 14, 2023

(54) SPECTRUM MEASUREMENT METHOD AND SPECTRUM MEASUREMENT DEVICE

(71) Applicant: Topcon Corporation, Tokyo (JP)

(72) Inventor: Akira Takada, Tokyo (JP)

(73) Assignee: Topcon Corporation, Tokyo (JP)

( * ) Notice: Subject to any disclaimer, the term of this patent is extended or adjusted under 35 U.S.C. 154(b) by 0 days.

(21) Appl. No.: 17/653,645

(22) Filed: Mar. 5, 2022

(65) Prior Publication Data
US 2022/0291043 A1    Sep. 15, 2022

(30) Foreign Application Priority Data

Mar. 11, 2021 (JP) ................................. 2021-038931

(51) Int. Cl.
*G01J 3/45* (2006.01)
*G01J 3/02* (2006.01)

(52) U.S. Cl.
CPC .................. *G01J 3/45* (2013.01); *G01J 3/021* (2013.01); *G01J 3/0208* (2013.01)

(58) Field of Classification Search
CPC ............... G01J 3/0208; G01J 3/45; G01J 3/10
See application file for complete search history.

(56) References Cited

U.S. PATENT DOCUMENTS

| | | | | |
|---|---|---|---|---|
| 7,567,204 B2* | 7/2009 | Sakamoto | ............. | G01S 13/345 342/91 |
| 10,718,868 B2* | 7/2020 | Hirota | .................... | G05D 1/024 |
| 11,112,310 B2* | 9/2021 | Anandarajah | ........... | G01J 3/427 |
| 11,165,219 B2* | 11/2021 | Ueno | ........................ | G01J 9/00 |
| 2007/0002327 A1* | 1/2007 | Zhou | .................. | G01B 9/02069 356/497 |
| 2009/0002713 A1* | 1/2009 | Ohbayashi | ......... | G01B 9/02091 356/477 |
| 2014/0031678 A1* | 1/2014 | Yamada | ............... | A61B 5/0066 600/425 |

FOREIGN PATENT DOCUMENTS

JP           5637358 B       12/2014

* cited by examiner

*Primary Examiner* — Uzma Alam
*Assistant Examiner* — Hoai Thi Thu Nguyen
(74) *Attorney, Agent, or Firm* — CHIESA, SHAHINIAN & GIANTOMASI PC

(57) ABSTRACT

A wavelength-swept light source is configured to generate light to be measured that is wavelength-swept coherent light with a wavelength periodically changed. The light to be measured is separated into a measurement section and a reference section that have different optical path lengths, and is then coupled in an interference section to generate interfering light. An analyzer performs a Fourier transform of interference signals of the interfering light, and acquires an actual measured noise floor value for each of the optical path length differences based on a point spread function. An estimated coherence time is determined so that an actual measured amplitude value of the noise floor value and a calculated amplitude value coincide with each other. Linewidth of the light emitted from the coherent light source is measured based on the estimated coherence time.

2 Claims, 6 Drawing Sheets

FIG.3

$$S_I^o(f) = \exp\left(-\frac{2\tau_0}{\tau_c}\right) T \exp\left[-1\left(\pi(f-f_b)T\right)^2\right] +$$

$$\frac{\tau_c}{1+\pi^2\tau_c^2(f-f_b)^2}\left\{\left[1-\exp\left(-\frac{2\tau_0}{\tau_c}\right)\right]\left[\cos(2\pi(f-f_b)\tau_0) + \frac{2\tau_0}{\tau_c}\frac{\sin(2\pi(f-f_b)\tau_0)}{2\pi(f-f_b)\tau_0}\right]\right\}$$

$T$ : ONE SWEEP TIME $f_b$ : BEAT FREQUENCY $\tau_0$ : DELAY TIME $\tau_c$ : COHERENCE TIME

SPECTRUM MEASUREMENT METHOD AND SPECTRUM MEASUREMENT DEVICE

CROSS-REFERENCE TO RELATED APPLICATIONS

This application claims priority to Japanese Patent Application No. 2021-038931, filed Mar. 11, 2021, the disclosure of which is incorporated herein by reference in its entirety.

BACKGROUND

The present disclosure relates to a spectrum measurement method and a spectrum measurement device.

In recent years, there have been significant technical developments for achieving automatic driving of a vehicle. Among the techniques, obstacle detection using images, millimeter-wave radars, or Light Detection and Rangings (LiDARs) are focused on. LiDARs need to have distance and angle measurement functions. As distance measurement methods, Time of Flight (ToF) systems using a pulsed light source and frequency modulated continuous wave (FMCW) systems using a modulated continuous wave have been competing with each other. In the FMCW system, narrowing of the laser linewidth during wavelength sweeping (which is temporarily referred to as an "instantaneous linewidth" in the present disclosure for the sake of convenience) is indispensable for realizing long distance measurement. It is therefore very important to measure the instantaneous linewidth of the wavelength sweeping.

The linewidth of coherent light can be calculated by determining coherence time. As a method for measuring such linewidth, a delayed self-heterodyne method described in Japanese Patent No. 5637358 is known, for example.

SUMMARY

However, the delayed self-heterodyne method measures the linewidth of the laser light emitted from a laser light source in a steady state where the wavelength is not swept, and cannot measure the linewidth of the coherent light whose wavelength is being swept (i.e., the instantaneous linewidth). It is known that the linewidth of light during wavelength sweeping is wider than that of light in a steady oscillation state.

A method of measuring the instantaneous linewidth based on a decrease in peak positions of a point spread function (PSF) is also known. However, in that case, an interferometer which causes interference at an optical path length difference greater than the coherence time (in other words, the coherence length) is required. For example, in the field of automatic driving of an automobile, it is inevitable that the measurement distance is of at least the order of ten meters or longer. In a case of using an interferometer that generates an optical path length difference that is twice or more as long as such a measurement distance, an increase in size of the measurement device is unavoidable, and measurement cannot be easy.

In view of the above, it is an object of the present disclosure to provide a spectrum measurement method and a spectrum measurement device for measuring linewidth of light emitted from a coherent light source, in which the linewidth during wavelength sweeping can be easily measured.

To solve the above problem, a spectrum measurement method according to an embodiment of the present disclosure is directed to a spectrum measurement method for measuring linewidth of light emitted from a coherent light source during wavelength sweeping, the method including: having a wavelength-swept light source generate light to be measured that is wavelength-swept coherent light with a wavelength periodically changed; separating the light to be measured into a measurement section and a reference section that have different optical path lengths, and then coupling the light to be measured in an interference section to generate interfering light; detecting the interfering light at a light detector to generate an interference signal; having an analyzer perform a Fourier transform of interference signals with an optical path length difference between the measurement section and the reference section changed, and acquiring an actual measured noise floor value for each of the optical path length differences based on a point spread function; calculating an actual measured amplitude value that is a difference between a first peak value and a first trough value of the actual measured noise floor value, the actual measured amplitude value varying in accordance with the optical path length difference; obtaining a calculated amplitude value that is a difference between a first peak value and a first trough value of a calculated noise floor value based on a point spread function to which a known parameter other than a coherence time is input; determining an estimated coherence time so that the actual measured amplitude value and the calculated amplitude value coincide with each other; and measuring the linewidth of the light emitted from the coherent light source based on the estimated coherence time.

To solve the above problem, a spectrum measurement device according to an embodiment of the present disclosure is directed to a spectrum measurement device for measuring linewidth of light emitted from a coherent light source during wavelength sweeping, the device including: a wavelength-swept light source configured to generate light to be measured that is wavelength-swept coherent light with a wavelength periodically changed; a measurement section and a reference section that have different optical path lengths, the measurement section and the reference section receiving the light to be measured that has been separated and transmitted to the measurement section and the reference section; an interference section configured to couple light separated into the measurement section and the reference section and generate interfering light; a light detector configured to detect the interfering light and generate an interference signal; and an analyzer configured to analyze the interference signal by performing a Fourier transform of the interference signal, in which the analyzer analyzes interference signals with an optical path length difference between the measurement section and the reference section changed, and acquires an actual measured noise floor value for each of the optical path length differences based on a point spread function, the analyzer calculates an actual measured amplitude value that is a difference between a first peak value and a first trough value of the actual measured noise floor value, the actual measured amplitude value varying in accordance with the optical path length difference, the analyzer obtains a calculated amplitude value that is a difference between a first peak value and a first trough value of a calculated noise floor value based on a point spread function to which a known parameter other than a coherence time is input, the analyzer determines an estimated coherence time so that the actual measured amplitude value and the calculated amplitude value coincide with each other, and the analyzer measures the linewidth of the light emitted from the coherent light source based on the estimated coherence time.

According to the present disclosure, the linewidth of light emitted from a coherent light source during wavelength sweeping can be easily measured.

BRIEF DESCRIPTION OF THE DRAWINGS

FIG. 3 is a calculation formula of the noise floor.

DETAILED DESCRIPTION

General Description

Figure 1:
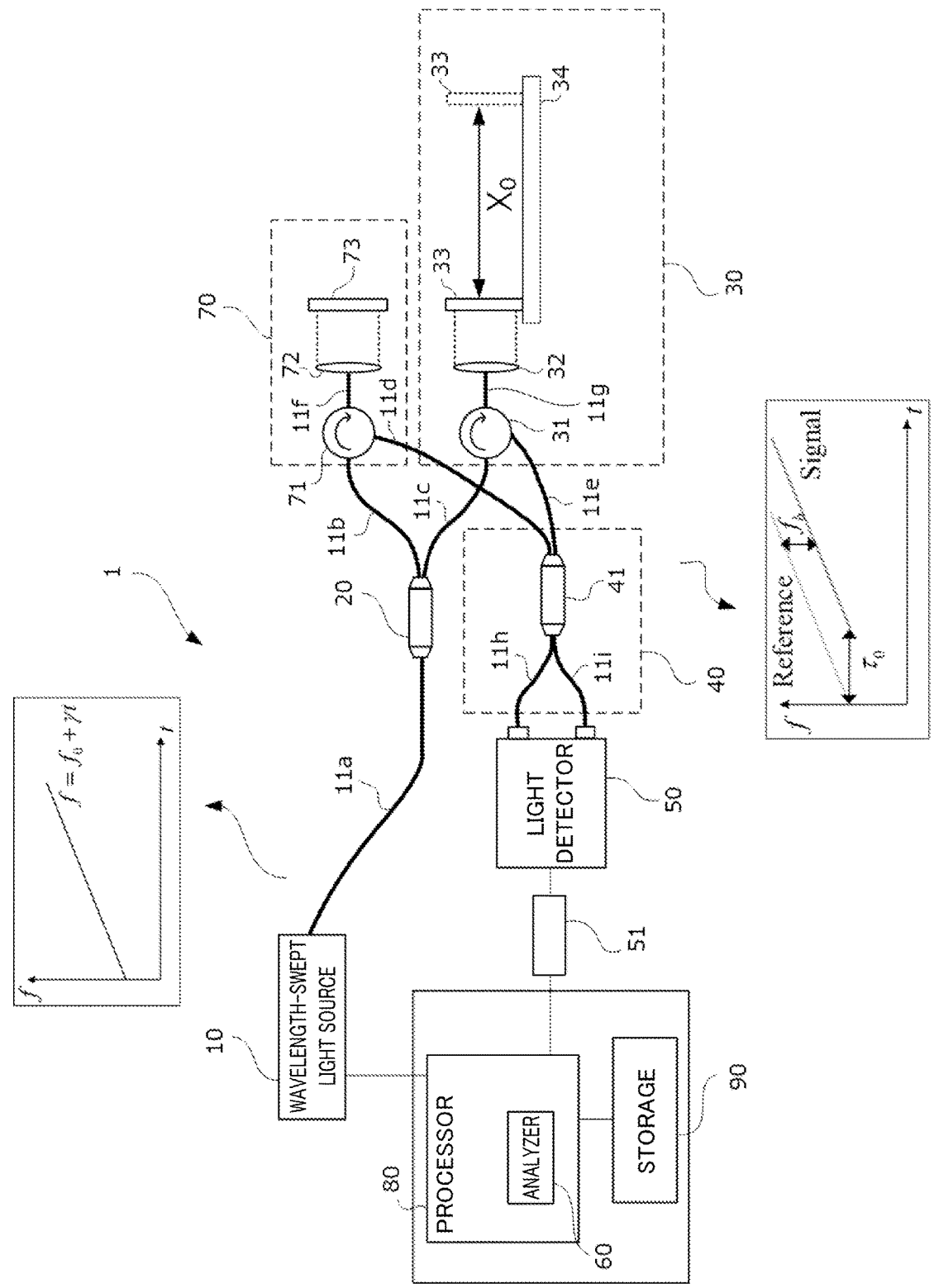
FIG. 1 is a diagram illustrating a schematic configuration of a spectrum measurement device according to an embodiment of the present disclosure.

Laser light, for example, is light having high coherency. The linewidth of light emitted from the coherent light source can be calculated if coherence length (i.e., coherence distance, basically which is integrally referred to as "coherence length" in the present disclosure) or coherence time (i.e., interfering time, basically which is integrally referred to as "coherence time" in the present disclosure) are obtained. The relationship between the coherence length $x_c$ and the coherence time $\tau_c$ is expressed by $C \cdot \tau_c = x_c$ (where C is the speed of light).

Assuming that the coherent light source used herein is a laser light source, the spectral distribution thereof is the Lorentz distribution and expressed by $S(f)=\delta f/2\pi[f^2+(\delta f/2)^2]$. $\delta f$ coincides with the FWHM (full width at half maximum) of the spectrum and is equal to the linewidth. The relationship of "$\tau_c=1/(\pi \cdot \delta f)$" is established between the coherence time $\tau_c$ and $\delta f$. The linewidth may exhibit the FWHM of the wavelength difference or the frequency difference. The linewidth to be measured herein is the instantaneous linewidth, which is the linewidth of the coherent light whose wavelength is being swept.

The following method of obtaining the instantaneous linewidth has been known: the coherence length is obtained based on roll-off of PSF peak positions obtained by a fast Fourier transform of an interference signal of light to be measured (i.e., based on a decrease in PSF peak intensity with an increase in optical path length difference), and the linewidth is measured based on the thus-obtained coherence length. However, in this case, an interferometer that generates an optical path length difference equal to or greater than the coherence length of the light to be measured is required. For example, in the field of automatic driving of an automobile, it is inevitable that the measurement distance is of the order of ten meters or longer, as mentioned earlier, and in a case of using an interferometer that generates an optical path length difference that is twice or more as long as such a measurement distance, an increase in size of the measurement device is unavoidable, and the measurement cannot be easy. In general, the optical path length of a built-in interferometer of a measuring instrument capable of measuring the coherence length is at most 100 mm.

Further, in order to measure the instantaneous linewidth based on the roll-off of the PSF of the coherent light whose wavelength is being swept, ultrahigh-speed processing is required in the sequential processing of receiving of light, AD conversion, and data transfer (these are hereinafter referred to as a detection system). Furthermore, the band of the detection system limits a measurable range of the coherence length. The band as used herein is a band of detection system (i.e., receiving of light, AD conversion, and data transfer) and is defined in a frequency domain. In contrast, the spectrum measurement device according to the present disclosure can measure the linewidth of light emitted from the light source even if the PSF peak positions are not detected within the band. A spectrum measurement device of this type is useful for the evaluation and calibration of a coherent light source configured to emit very narrow coherent light, in particular the evaluation and calibration of a coherent light source configured to emit wavelength-swept coherent light, irrespective of the field of application.

Hereinafter, a spectrum measurement device according to an embodiment of the present disclosure will be described with reference to the drawings. The spectrum measurement device 1 is configured to separate wavelength-swept light into optical systems (i.e., a measurement system and a reference system) having different optical path lengths, thereafter couple the separated light together to generate interfering light, detect the interfering light and obtain an interference signal, based on which signal the linewidth of the light emitted from the coherent light source is measured.

FIG. 1 is a diagram illustrating a schematic configuration of a spectrum measurement device according to the embodiment of the present disclosure. The spectrum measurement device 1 includes a wavelength-swept light source 10, a light splitter 20, a reference section 70, a measurement section 30, an interference section 40, a light detector 50, and an analyzer 60.

Although not illustrated, the wavelength-swept light source 10 includes a coherent light source, such as a laser light source, and emits wavelength-swept light whose wavelength is swept with an MEMS scanning mirror, for example. The wavelength-swept light source 10 enables wavelength sweeping in which a frequency (wavelength) of light is changed periodically in a predetermined sweep frequency band $\Delta F$ and in one sweep time (cycle period) T, and linearly at a constant amount of change. As illustrated in FIG. 1, the frequency (wavelength) changes with time at a predetermined chirp rate of $\gamma=\Delta F/T$ from the frequency $f_0$ at the start of sweep.

The light to be swept may be such light whose center wavelength (also referred to as the "sweep center wavelength") is included in an eye safety region (light in this region is safe for human eyes), specifically a near infrared region, e.g., 1550 nm band, for automatic driving of vehicles.

The light emitted from such a wavelength-swept light source 10 transmits through an optical guide path 11a comprised of an optical fiber or the like, and reaches the light splitter 20.

The light splitter 20 splits the light emitted from the wavelength-swept light source 10 into light to be measured and reference light. The light splitter 20 is, for example, a 1×2 optical coupler for splitting an optical path. The light split by the light splitter 20 transmits to the reference section 70 through an optical guide path 11b and to the measurement section 30 through an optical guide path 11c separately.

The reference section 70 is a system that functions as a reference for light to be measured in the measurement section 30. The light to transfer through the reference section 70 passes through an optical circulator 71 and is emitted through an optical guide path 11f. The light is then shaped into parallel light by an optical element 72, such as a collimating lens, and is reflected on a reference mirror 73 having a metallic mirror surface, for example. The reference light reflected (return light of the reference light) passes through the optical element 72, which also functions as a light receiving system of the reference section 70, passes through an optical guide path 11*d*, and is guided to the interference section 40.

In the measurement section 30, the light to be measured passes through an optical circulator 31 and is emitted through an optical guide path 11*g*. The light is then shaped into parallel light by an optical element 32, such as a collimating lens, and is emitted toward a movable mirror 33 from the optical element 32, such as a collimating lens, similarly to the reference section 70. The movable mirror 33 is movable on a stage 34 uniaxially to the position of a movable mirror 33', which makes it possible to generate an optical path length difference of the distance Xo with respect to the reference section 70. The return light from the movable mirror 33 (33') (light including light reflected by the movable mirror 33 (33') and light scattered by the movable mirror 33 (33')) passes through the optical element 32, which also functions as a light receiving system of the measurement section 30, passes through an optical guide path 11*e*, and is guided to the interference section 40.

The interference section 40 is a system which couples the light to be measured that has been reflected or scattered by the respective mirrors and the reference light together to produce interfering light. The return light from the measurement section 30 and the return light from the reference section 70 become interfering light as a result of their optical paths being combined together by a light combiner 41, which is, for example, a 2×2 optical coupler for combining optical paths, and interfering with each other. The interfering light is guided to the light detector 50 through optical guide paths 11*h* and 11*i*.

The measurement section 30, the reference section 70, and the interference section 40 may have different configurations that have equivalent functions to the functions of these sections. The optical paths are not limited to those described in this example, and appropriate optical paths may be set freely. For example, optical paths may be designed freely using a beam splitter and/or a half mirror, and various optical elements having the function of selecting a wavelength and/or adjusting a polarization state may be disposed in the optical paths.

The light detector 50 is for detecting interfering light. The light detector 50 may be, for example, a balanced photodetector (BPD) that uses photoelectric conversion elements, such as two photodiodes, and outputs a differential. The light detector 50 outputs an interference signal. The interference signal is input to the analyzer 60 through a filter 51.

The filter 51 is not an optical filter that selects wavelengths, but an electric filter that detects interfering light as an interference signal and then extracts predetermined frequency components from the interference signal. For example, the filter 51 may be a low-pass filter (LPF) that removes a variation period with a frequency higher than or equal to a predetermined frequency.

As illustrated in FIG. 1, the time at which the measurement light (Signal) reaches the light combiner 41 and the time at which the reference light (Reference) reaches the light combiner 41 are shifted by to (delay time) due to the optical path length difference, and the frequency difference appears as a beat frequency fb.

The interference signal is subjected to the fast Fourier transform (FFT) processing in the analyzer 60 and is output as a calculation result. The FFT converts the interference signal in a time domain into a signal in a frequency domain. The interference signal may be sampled at a predetermined sampling rate and stored in a storage 90. The analyzer 60 may also be program software that is stored in the storage 90 and performs the analysis function by being executed by a processor 80.

The processor 80 executes the functions and/or methods implemented by codes or commands included in the programs stored in the storage 90. Examples of the processor 80 include a central processing unit (CPU), a microprocessor unit (MPU), a graphics processing unit (GPU), a microprocessor, a processor core, a multiprocessor, an application specific integrated circuit (ASIC), and a field-programmable gate array (FPGA). The processor 80 may include a logic circuit or a dedicated circuit formed in an integrated circuit, for example, to execute the processing disclosed in the embodiment. These circuits may be implemented as one or more integrated circuits. A single integrated circuit may execute the plural types of processing described in the embodiment.

The storage 90 has the function of storing various programs or various data that are needed. The storage 90 can store acquired information, such as signals measured. The storage 90 is implemented as various storage media, such as a hard disk drive (HDD), a solid-state drive (SSD), and a flash memory.

Figure 2:
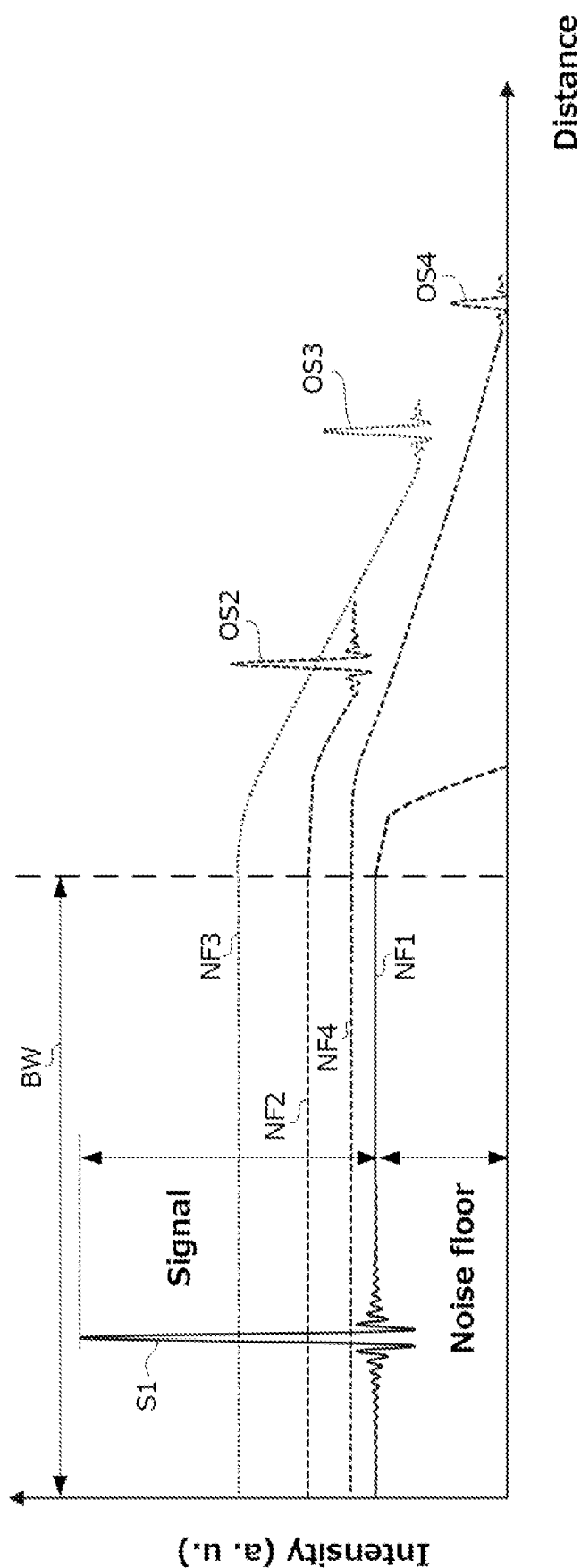
FIG. 2 is a graph for explaining variations in the noise floor.

FIG. 2 is a schematic figure illustrating an example result of FFT analysis performed by the analyzer 60 in measurement by the spectrum measurement device 1. Changes in the noise floor will be described with reference to this diagram. The signal-to-noise ratio in the interference measurement is determined based on various factors, such as the amount of light received, the amount of reference light, shot noise, intensity noise, and phase noise. Generally, in coherence detection, the signal-to-noise ratio is determined mainly by the shot noise, but in a measurement of a distance equivalent to a coherence length, the signal-to-noise ratio is determined rather by the phase noise. The phase noise does not depend on the amount of light received nor on the amount of reference light. Thus, the signal-to-noise ratio determined by the phase noise is not affected by the amount of light received nor the amount of reference light, and is not affected even if the light amount of the light source is increased in an attempt to increase the light amount of the signals.

FIG. 2 is a schematic graph showing a PSF obtainable by multiplying an interference signal by a window function, where the vertical axis represents signal intensity (a. u.) and the horizontal axis represents distance (m) converted based on frequency. In this graph, a signal peak S1 is detected within the band (or bandwidth) BW that is a measurable range on the horizontal axis. In the interference measurement, such as the FMCW distance measurement, the distance to a subject is measurable based on the peak position of such a signal. Even in the case of a signal whose peak appears within the band BW as in this example, there is the noise floor NF1 due to noise having a certain intensity level as indicated by an arrow. Phase noise described above may be one of factors of the noise floor.

Meanwhile, there are peaks that are not detected in this band BW, and these peaks will be temporarily referred to as out-of-band signal peaks. In this graph, the out-of-band signal peak OS2 can be assumed to be of a signal due to light reflected by an object at a greater distance than the object relating to the signal peak S1. Since the out-of-band signal peak OS2 corresponding to the object is outside the band BW, the signal peak is not actually detected. However, if the band BW includes the frequency of the out-of-band signal peak OS2, it is assumed that the out-of-band signal peak OS2 is detected at a position indicated by a dotted line in FIG. 2. Effects of the noise due to the out-of-band signal peak OS2 appear in the band BW as an increase in noise floor, which is observed as the noise floor NF2 having a certain intensity level within the band BW.

It is assumed that such noise is generated because a low-frequency component (short-distance component) of reflected light generated outside a measurement range cannot be cut by the filter 51 and is observed as the noise floor without being limited by the band of the detection system. The intensity of this noise floor varies according to the position of the out-of-band signal peak, that is, the distance to the object that has caused reflection of light. As shown in this graph, an out-of-band signal peak OS3 is due to light reflected from a greater distance than the light relating to the out-of-band signal peak OS2, and the noise floor NF3 of the out-of-band signal peak OS3 has higher intensity than the noise floor NF2 of the out-of-band signal peak OS2. On the other hand, an out-of-band signal peak OS4 is due to light reflected from a greater distance than the light relating to the out-of-band signal peak OS3, and the noise floor NF4 of the out-of-band signal peak OS4 has lower intensity than the noise floor NF3 of the out-of-band signal peak OS3. That is, the intensity of the noise floor increases or decreases depending on the peak position of the signal, i.e., the optical path length difference.

Such an increase in noise, i.e., the noise floor is an obstacle, e.g., a narrower dynamic range, in an attempt to measure the distance. However, turning the obstacle to advantages, the inventor of the present disclosure considered that the linewidth of light emitted from the light source could be measured even in the outside of the band by using this noise. The degree of rise in the noise floor increases or decreases depending on the wavelength sweep width, one sweep time, delay time, and coherence time. Those except the coherence time are known or measurable. The inventors therefore thought that the coherence time, in other words, the linewidth could be measured by measuring a value of such noise floor.

FIG. 3 shows a calculation formula for calculating a noise floor value (noise value). The calculation formula expresses the power spectral density of noise by a point spread function. This formula is a calculation formula of a PSF in consideration of coherence time, sweep time (sweep speed), and the like. In the formula, f is a frequency, relates to an optical path length difference and delay time, and changes in accordance with the position of the movable mirror 33. In this formula, T is one sweep time and is a known value; To is delay time and is a known value; and fb is a beat frequency and is a difference in frequency. The beat frequency is determined by a combination of known values of the wavelength sweep width, the one sweep time, and the delay time, i.e., an optical path length difference. Actual measured values and calculated values (theoretical values) of these noise floor values are considered to coincide with each other, which leads a conclusion that the instantaneous linewidth is obtainable by determining the coherence time so that the actual measured values and the calculated values (theoretical values) of this formula coincide with each other by using the $S_1^o(f)$ in the frequency domain lower than or equal to the band of the detector. As $S_1^o(f)$ to be compared, an average value of the $S_1^o(f)$ in a certain band defined by predetermined frequencies (or distances), for example, can be used.

Figure 4:
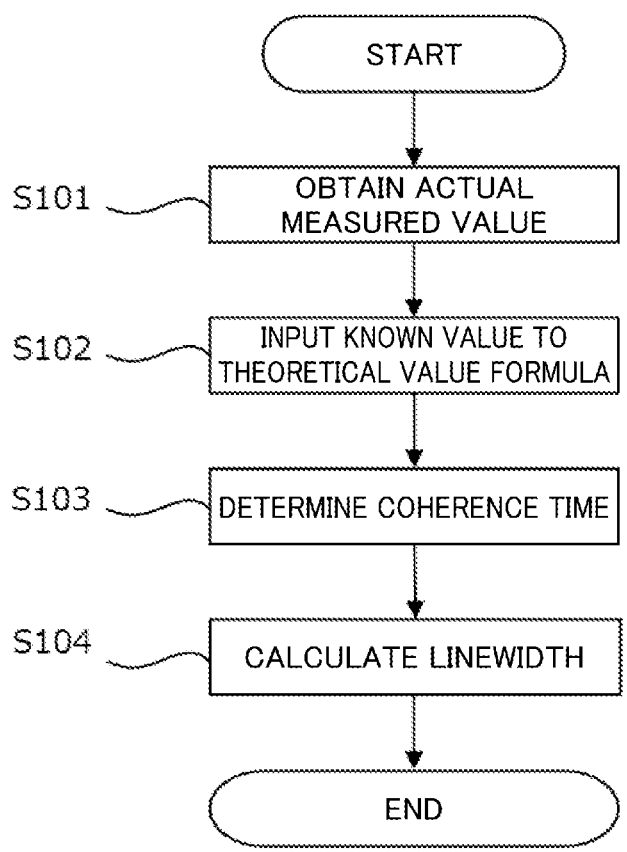
FIG. 4 is a flowchart showing the flow of linewidth measurement.

This will be summarized as a measurement method. FIG. 4 is a flowchart showing the flow of linewidth measurement.

In Step S101, the analyzer 60 first measures the wavelength-swept light source 10 that is a measurement target to acquire an actual measured noise floor value. In order to acquire an actual measured noise floor value, the spectrum measurement device illustrated in FIG. 1 causes the wavelength-swept light source 10, which emits light to be measured that is a measurement target, to emit wavelength-swept light with the wavelength being periodically changed.

The light to be measured whose wavelength has been swept is separated into the measurement section 30 and the reference section 70 having different optical path lengths. The light reflected or scattered by the measurement section 30 and reference section 70 are coupled together by the interference section 40 to be interfering light. The light detector 50 detects the interfering light and outputs an interference signal. The interference signal passes through the filter 51, and then, the analyzer 60 conducts an FFT analysis on the interference signal. This series of processes is performed with different optical path length differences by moving the movable mirror 33, thereby acquiring actual measured values for the respective optical path length differences (reflection distances). The optical path length difference may be changed only in an out-of-band region.

Figure 5:
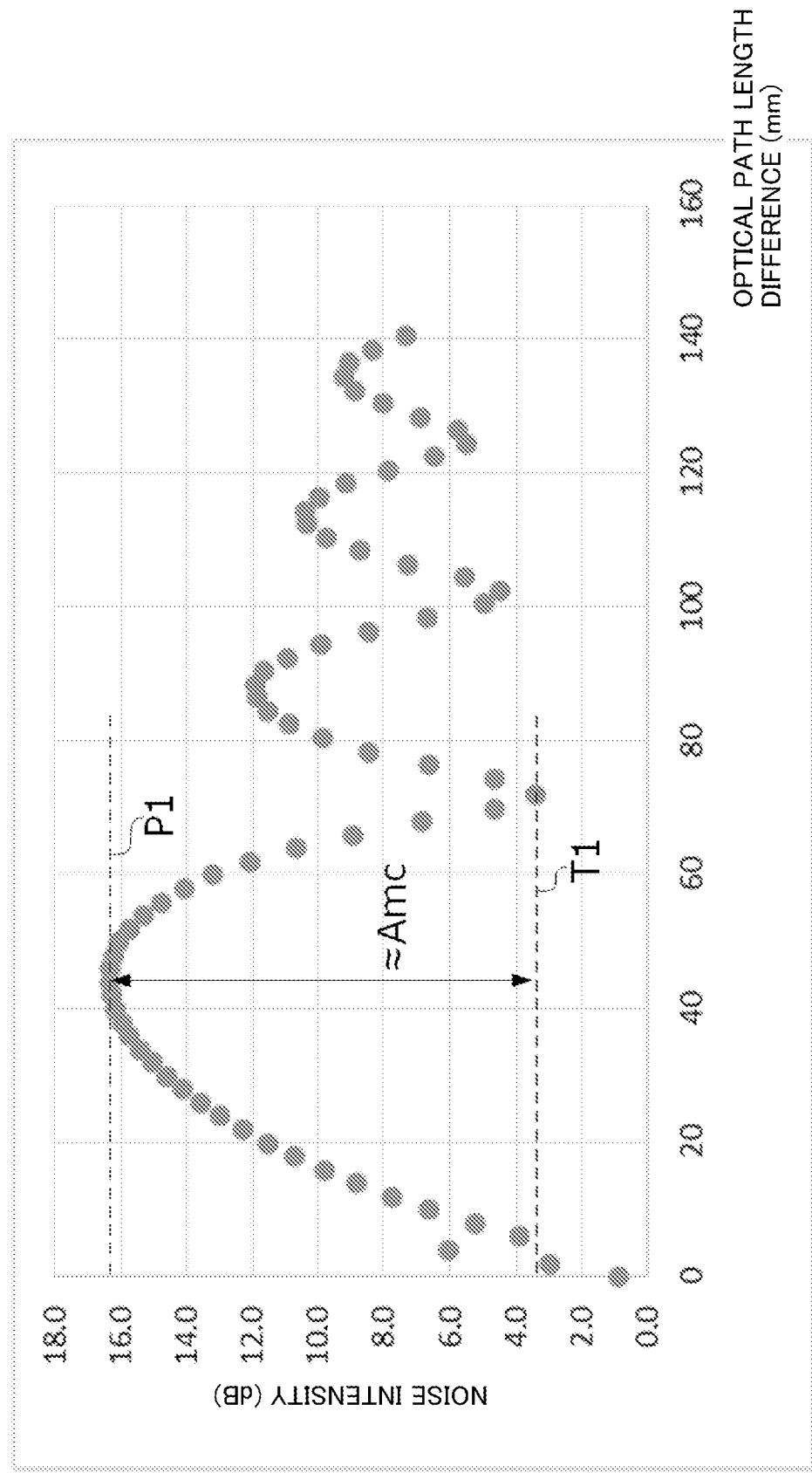
FIG. 5 is a graph showing actual measured values of the noise floor.

In one preferred embodiment, for more accurate measurement, an amplitude value that is a difference between values of predetermined different inflection points is used as the noise floor value, instead of comparing an actual measured value and a calculated value at one point. This will be described below. FIG. 5 is a graph showing actual measured noise floor values. In this graph, the horizontal axis represents the optical path length difference, and the vertical axis represents the noise floor value (noise intensity (DB)). The measurement results shown in this graph will be described later.

As shown in FIG. 5, the average intensity of the noise floor value exhibits a wave-like behavior which repeats up and down movements between a peak value that is an inflection point of a mountain-like curve and a trough value that is an inflection point of a valley-like curve, with an increase in the optical path length difference, that is, the reflection distance. This up-and-down movement itself is based on the calculation formula shown in FIG. 3. However, since the second and subsequent peak values and the second and subsequent trough values fluctuate due to various factors, such as the linearity of the wave sweeping, the difference between the first peak value (for example, the first peak value P1) and the first trough value (for example, the first trough value T1) prior to the fluctuations due to various factors is selected as the points at which the noise floor of the actual measured value and the noise floor of the calculated value are made to coincide with each other, in one preferred embodiment. The difference between the first peak value and the first trough value is referred to as an amplitude value in the present disclosure, and the difference between the first peak value and the first trough value of the actual measured values, in particular, is referred to as an actual measured amplitude value Amm.

The first peak value and the first trough value of the actual measured noise floor value are acquired, and a difference between the first peak value and the first trough value is acquired as an amplitude value. The average intensity within the band range shown in FIG. 2 can be used as values of the noise floor. If the fluctuation of the noise value is small and stable within the band range, a noise value at one arbitrary point may be acquired instead of the average intensity.

In Step S102, the analyzer 60 performs a calculation to obtain the calculated value. To obtain the calculated value, known values other than the coherence time are input as parameters to variables of the formula shown in FIG. 3. Specifically, T is one sweep time (sec); fb is a beat frequency (Hz); and $\tau_O$ is delay time. At this point, only the amplitude value and coherence time are not known to obtain the calculated value.

In Step S103, assuming that the amplitude value is the same as an actual measured amplitude value, the coherence time in the calculation formula is determined such that a calculated amplitude value Amc, which is the difference between the first peak value of the calculated noise floor value and the first trough value of the calculated noise floor value, coincide with the actual measured amplitude value Amm. The thus-obtained value will be temporarily referred to as an estimated coherence time. Since variables other than the coherence time are known values, the value of the estimated coherence time is uniquely determined.

In Step S104, the analyzer 60 calculates linewidth using the coherence time $\tau_c$ determined in Step S103. As described above, the linewidth is $\delta f$. Since the equation of $\tau_c = 1/(\pi \cdot \delta f)$ holds, the analyzer 60 can calculate the linewidth using the equation of $\delta f = 1/(\pi \cdot \tau_c)$.

An example of measuring an actual instantaneous linewidth by this method will be described. In this example, the band of the detection system was set to 200 MHz or lower. This band may be 200 kHz or lower. First, in the spectrum measurement device 1 illustrated in FIG. 1, the movable mirror 33 was moved to a position where the optical path length difference was such that the peak of the PSF exceeded 200 MHz. Then, the average intensity of the noise floor value was measured while moving the movable mirror 33 on the measurement stage. The first peak value and the first trough value were acquired, and the actual measured amplitude value was calculated. FIG. 5 shows the noise floor values which are also actual measured values of this example, and actual measured amplitude values of approximately 12 dB were acquired within a range of about 0 mm to 160 mm.

Figure 6:
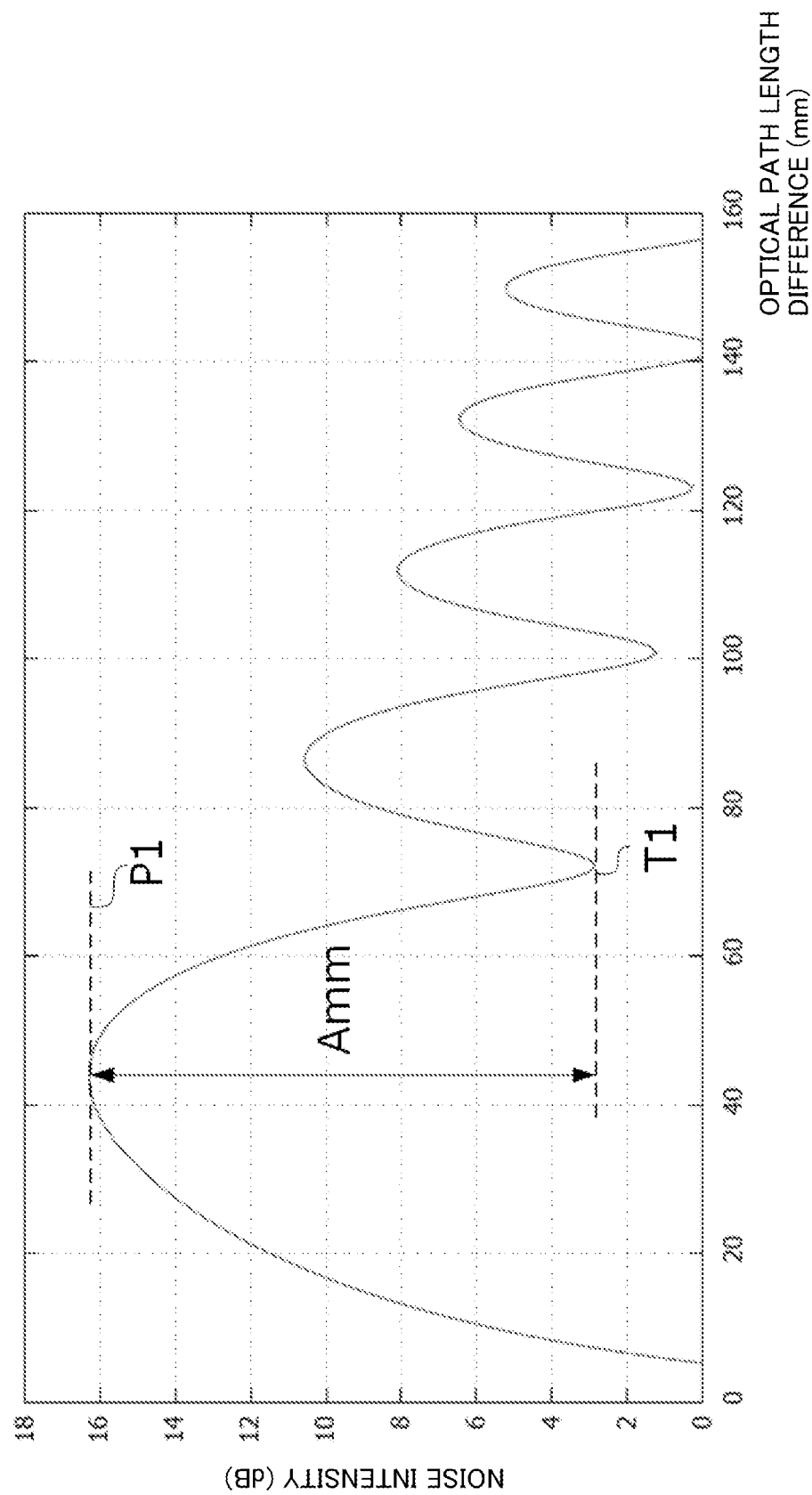
FIG. 6 is a graph showing calculated values of the noise floor.

In this example, one sweep time T was set to 6.5 µl sec and the wavelength sweep width was set to 30 THz (100 nm). These known values are also used in the formula shown in FIG. 3 to calculate the average intensity of the noise floor with respect to the delay time (optical path length difference Xo), and the coherence time is determined so that the calculated amplitude value be equal to the actual measured amplitude value. The instantaneous linewidth is then calculated from the obtained coherence time. As shown in FIG. 6, the noise value is calculated so that the calculated amplitude value be equal to the actual measured amplitude value. As described above, the calculated values basically coincide with the actual measured values in the graph, but the second and subsequent peak values and the second and subsequent trough values vary due to various factors. The coherence time of this case at which the actual measured amplitude value and the calculated amplitude value become equal to each other is determined to be 15 nsec. Accordingly, the linewidth calculated is 21.2 MHz.

The coherence time of 15 nsec corresponds to the coherence length of 4.5 m. This means that even the measurement with the optical path length difference of 160 mm or less enables the measurement of the instantaneous linewidth of light emitted from a coherent light source having a coherence length much longer than the optical path length difference. Accordingly, the linewidth during wavelength sweeping can be evaluated without being limited by the band of the detection system.

According to a spectrum measurement device and a spectrum measurement method according to an embodiment of the present disclosure, a wavelength-swept light source 10 is configured to generate light to be measured that is wavelength-swept coherent light with a wavelength periodically changed. The light to be measured is separated into a measurement section 30 and a reference section 70 that have different optical path lengths, and is then coupled in an interference section 40 to generate interfering light. The interfering light is detected at a light detector 50 to generate an interference signal. An analyzer 60 performs a Fourier transform of interference signals with an optical path length difference between the measurement section 30 and the reference section 70 changed, and acquires an actual measured noise floor value for each of the optical path length differences. The analyzer 60 calculates an actual measured amplitude value that is a difference between a first peak value and a first trough value of the actual measured noise floor value, the actual measured amplitude value varying in accordance with the optical path length difference. The analyzer 60 obtains a calculated amplitude value that is a difference between a first peak value and a first trough value of a calculated noise floor value obtained by inputting a known parameter other than a coherence time. The analyzer 60 determines an estimated coherence time so that the actual measured amplitude value and the calculated amplitude value coincide with each other. The analyzer 60 measures the linewidth of the coherent light source based on the estimated coherence time. Accordingly, the linewidth of light during wavelength sweeping can be easily measured without using a large-sized measurement device having therein a long optical path length. In addition, the linewidth during wavelength sweeping can be evaluated without being limited by the band of the detection system.

The embodiment of the present disclosure has been described above, but the aspects of the present disclosure are not limited to the embodiment.

DESCRIPTION OF REFERENCE CHARACTERS

| | |
|---|---|
| 1 | Spectrum Measurement Device |
| 10 | Wavelength-Swept Light Source |
| 20 | Light Splitter |
| 31 | Optical Circulator |
| 32 | Optical Element |
| 38 | Light Projecting Section |
| 39 | Light Receiving Section |
| 30 | Measurement Section |
| 33 | Movable Mirror |
| 40 | Interference Section |
| 41 | Light Combiner |
| 50 | Light Detector |
| 51 | Filter |
| 60 | Analyzer |
| 70 | Reference Section |
| 71 | Optical Circulator |
| 72 | Optical Element |
| 73 | Reference Mirror |
| 80 | Processor |
| 90 | Storage |
| 321 | Optical Element |
| S1 | Signal Peak |
| OS2, OS3, OS4 | Out-Of-Band Signal Peak |
| NF1, NF2, NF3, NF4 | Noise Floor |
| P1 | First Peak Value |
| T1 | First Trough Value |
| Amm | Actual Measured Amplitude Value |
| Amc | Calculated Amplitude Value |

The invention claimed is:

1. A spectrum measurement method for measuring linewidth of light emitted from a coherent light source during wavelength sweeping, the method comprising:

having a wavelength-swept light source generate light to be measured that is wavelength-swept coherent light with a wavelength periodically changed;

separating the light to be measured into a measurement section and a reference section that have different optical path lengths, and then coupling the light to be measured in an interference section to generate interfering light;

detecting the interfering light at a light detector to generate an interference signal;

having an analyzer perform a Fourier transform of interference signals with an optical path length difference between the measurement section and the reference section changed, and acquiring an actual measured noise floor value for each of the optical path length differences based on a point spread function;

calculating an actual measured amplitude value that is a difference between a first peak value and a first trough value of the actual measured noise floor value, the actual measured amplitude value varying in accordance with the optical path length difference;

obtaining a calculated amplitude value that is a difference between a first peak value and a first trough value of a calculated noise floor value based on a point spread function to which a known parameter other than a coherence time is input;

determining an estimated coherence time as the time when the actual measured amplitude value and the calculated amplitude value coincide with each other; and measuring the linewidth of the light emitted from the coherent light source based on the estimated coherence time.

2. A spectrum measurement device for measuring linewidth of light emitted from a coherent light source during wavelength sweeping, the device comprising:

a wavelength-swept light source configured to generate light to be measured that is wavelength-swept coherent light with a wavelength periodically changed;

a measurement section and a reference section that have different optical path lengths, the measurement section and the reference section receiving the light to be measured that has been separated and transmitted to the measurement section and the reference section;

an interference section configured to couple light separated into the measurement section and the reference section and generate interfering light;

a light detector configured to detect the interfering light and generate an interference signal; and an analyzer configured to analyze the interference signal by performing a Fourier transform of the interference signal, wherein the analyzer analyzes interference signals with an optical path length difference between the measurement section and the reference section changed, and acquires an actual measured noise floor value for each of the optical path length differences based on a point spread function, the analyzer calculates an actual measured amplitude value that is a difference between a first peak value and a first trough value of the actual measured noise floor value, the difference varying in accordance with the optical path length difference, the analyzer obtains a calculated amplitude value that is a difference between a first peak value and a first trough value of a calculated noise floor value based on a point spread function to which a known parameter other than a coherence time is input, the analyzer determines an estimated coherence time as the time when the actual measured amplitude value and the calculated amplitude value coincide with each other, and the analyzer measures the linewidth of the light emitted from the coherent light source based on the estimated coherence time.

* * * * *